United States Patent
Yao et al.

(10) Patent No.: US 8,261,458 B2
(45) Date of Patent: Sep. 11, 2012

(54) GEOMAGNETIC SENSOR DEVICE AND DIGITAL COMPASS WITH THE SAME

(75) Inventors: Minggao Yao, Hong Kong (CN); Yamanoi Koyu, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/064,574

(22) Filed: Mar. 31, 2011

(65) Prior Publication Data

US 2012/0186091 A1   Jul. 26, 2012

(30) Foreign Application Priority Data

Jan. 26, 2011   (CN) .......................... 2011 1 0027906

(51) Int. Cl.
*G01C 17/28* (2006.01)
(52) U.S. Cl. ..................................... 33/355 R
(58) Field of Classification Search .................... 33/316, 33/319, 324, 355 R, 356
See application file for complete search history.

(56) References Cited

U.S. PATENT DOCUMENTS

| | | | |
|---|---|---|---|
| 3,899,834 A * | 8/1975 | Harrison, Jr. .................. 33/352 |
| 6,836,971 B1 * | 1/2005 | Wan ................................ 33/356 |
| 7,818,890 B2 * | 10/2010 | Duric et al. ................. 33/355 R |
| 2002/0014016 A1 * | 2/2002 | Kato ........................... 33/355 R |
| 2005/0193578 A1 * | 9/2005 | Toda .............................. 33/327 |
| 2006/0213070 A1 * | 9/2006 | Goldsobel et al. ......... 33/366.21 |
| 2007/0089311 A1 * | 4/2007 | Amundson et al. ......... 33/355 R |

* cited by examiner

*Primary Examiner* — G. Bradley Bennett
(74) *Attorney, Agent, or Firm* — Nixon & Vanderhye PC

(57) ABSTRACT

A geomagnetic sensor device comprises a first geomagnetic sensor comprising a first Wheatstone bridge circuit and a second Wheatstone bridge circuit which are arranged in the same horizontal coordinate system, and a second geomagnetic sensor comprising a third Wheatstone bridge circuit and a fourth Wheatstone bridge circuit which are arranged in the same vertical coordinate system. Each of the Wheatstone bridge circuits comprises at least four magnetoresistive elements connecting and having power input terminals and signal output terminals. The present invention can obtains a stable and high output signal and achieves high measurement accuracy for the geomagnetic azimuth angle. The present invention also discloses a digital compass.

12 Claims, 4 Drawing Sheets

US 8,261,458 B2

GEOMAGNETIC SENSOR DEVICE AND DIGITAL COMPASS WITH THE SAME

This application claims the benefit of Chinese Patent Application No. 201110027906.9, filed 26 Jan. 2011, the entire contents of which is hereby incorporated by reference in this application.

FIELD OF THE INVENTION

The present invention relates to a digital compass and, more particularly, to a digital compass including a geomagnetic sensor device with high signal output and high accuracy to measure the geomagnetic azimuth angle.

BACKGROUND OF THE INVENTION

Nowadays, digital compass (called electronic compass as well) made of magnetoresistive material is popular in the navigation, location and vectoring field, which aims at measuring the geomagnetic field direction. Comparing with the conventional compass, the digital compass possesses the prominent advantages including small size, low consumption, low cost, high sensitivity, high frequency response and the like.

As the resistance of the magnetoresistive material varies with the external magnetic field, thus the digital compass can achieve the magnetic field measurement by utilizing this effect. Generally, the digital compass made of magnetoresistive material uses a two-axis or three-axis geomagnetic sensor to measure the geomagnetic field components on the X-axis, Y-axis (and Z-axis) respectively, and a two-axis or three-axis acceleration sensor for measuring the pitching angle and the roll angle. And the geomagnetic azimuth angle can be measured out according to the above data information.

FIG. 1 shows a conventional digital compass 500 includes a two-axis geomagnetic sensor 501 for detecting the geomagnetic azimuth angle, an acceleration sensor 502 for detecting the titled geomagnetic angle on the basis of the horizontal line, an analog processor 503 for amplifying and filtering the signal detected by the geomagnetic sensor 501 and the acceleration sensor 502, an analog/digital converter 504 for converting the output signal into digital signal, and a digital processor 505 for calculating a geomagnetic azimuth angle on the basis of the digital signal received from the analog/digital converter 504, and performing the calibration process. Concretely, the geomagnetic sensor 501 is adapted for measuring the magnetic field intensity of the earth, which includes an X-axis sensor and Y-axis sensor arranged in right angle. The acceleration sensor 502 measures the pitching angle and the roll angle for compensating the titled coordinate.

However, the output signal and the measurement accuracy are the main issue always. As mentioned, the above digital compass must receive the digital signal to perform calibration process. Additionally, the output signal of the geomagnetic sensor 501 may change and vary with the outer environment suddenly, which causes the offset of the output signal of the digital compass to vary with the outer environment abruptly. Thus, the measurement accuracy of the geomagnetic azimuth angle is decreased. Furthermore, the above digital compass with complex structure causes a high cost as well.

Thus, there is a need for an improved digital compass with an improved geomagnetic sensor device to overcome the above drawbacks.

SUMMARY OF THE INVENTION

One aspect of the present invention is to provide a geomagnetic sensor device with a simple structure which obtains a stable and high output signal and achieves high measurement accuracy for the geomagnetic azimuth angle.

Another aspect of the present invention is to provide a digital compass including a geomagnetic sensor device, which obtains a stable and high output signal and achieves high measurement accuracy for the geomagnetic azimuth angle.

To achieve above objectives, a geomagnetic sensor device comprises a first geomagnetic sensor comprising a first Wheatstone bridge circuit and a second Wheatstone bridge circuit which are arranged in the same horizontal coordinate system, and a second geomagnetic sensor comprising a third Wheatstone bridge circuit and a fourth Wheatstone bridge circuit which are arranged in the same vertical coordinate system. Each of the Wheatstone bridge circuits comprises at least four magnetoresistive elements connecting and having power input terminals and signal output terminals.

As an embodiment, the horizontal coordinate system is X-Y horizontal coordinate system, the horizontal coordinate system is Y-Z vertical coordinate system.

Preferably, the magnetization direction of the magetoresistive elements of the first Wheatstone bridge circuit is on the X-axis, the magnetization direction of the magetoresistive elements of the second Wheatstone bridge circuit and the third Wheatstone bridge circuit is on the Y-axis, and the magnetization direction of the magetoresistive elements of the fourth Wheatstone bridge circuit is on the Z-axis.

As another embodiment, the horizontal coordinate system is X-Y horizontal coordinate system, the horizontal coordinate system is X-Z vertical coordinate system.

Preferably, the magnetization direction of the magetoresistive elements of the second Wheatstone bridge circuit is on the Y-axis, the magnetization direction of the magetoresistive elements of the first Wheatstone bridge circuit and the third Wheatstone bridge circuit is on the X-axis, and the magnetization direction of the magetoresistive elements of the fourth Wheatstone bridge circuit is on the Z-axis.

Preferably, the magnetoresistive elements are giant magnetoresistive, tunnel magnetoresistive, anisotropic magnetoresistive, or Hall elements.

A digital compass, comprises a geomagnetic sensor device, the geomagnetic sensor device comprises a first geomagnetic sensor comprising a first Wheatstone bridge circuit and a second Wheatstone bridge circuit which are arranged in the same horizontal coordinate system, and a second geomagnetic sensor comprising a third Wheatstone bridge circuit and a fourth Wheatstone bridge circuit which are arranged in the same vertical coordinate system. Each of the Wheatstone bridge circuit comprises at least four magnetoresistive elements connecting and having power input terminals and signal output terminals.

As an embodiment, the horizontal coordinate system is X-Y horizontal coordinate system, the horizontal coordinate system is Y-Z vertical coordinate system.

Preferably, the magnetization direction of the magetoresistive elements of the first Wheatstone bridge circuit is on the X-axis, the magnetization direction of the magetoresistive elements of the second Wheatstone bridge circuit and the third Wheatstone bridge circuit is on the Y-axis, and the magnetization direction of the magetoresistive elements of the fourth Wheatstone bridge circuit is on the Z-axis.

As another embodiment, the horizontal coordinate system is X-Y horizontal coordinate system, the horizontal coordinate system is X-Z vertical coordinate system.

Preferably, the magnetization direction of the magetoresistive elements of the second Wheatstone bridge circuit is on the Y-axis, the magnetization direction of the magetoresistive elements of the first Wheatstone bridge circuit and the third Wheatstone bridge circuit is on the X-axis, and the magnetization direction of the magetoresistive elements of the fourth Wheatstone bridge circuit is on the Z-axis.

Preferably, the magnetoresistive elements are giant magnetoresistive, tunnel magnetoresistive, anisotropic magnetoresistive, or Hall elements.

In comparison with the prior art, the first geomagnetic sensor with two Wheatstone bridge circuit arranged in the same horizontal coordinate system measures out the pitching angle, and the second geomagnetic sensor with two Wheatstone bridge circuit arranged in the same vertical coordinate system measures out the roll angle, the geomagnetic azimuth angle of the geomagnetic field can be measured and detected, and in turn, achieving the orientation. The present invention can obtain a stable and high output signal and achieve high measurement accuracy for the geomagnetic azimuth angle. Furthermore, the structure of the geomagnetic sensor device is simple, which reduces manufacturing cost.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

Figure 1:
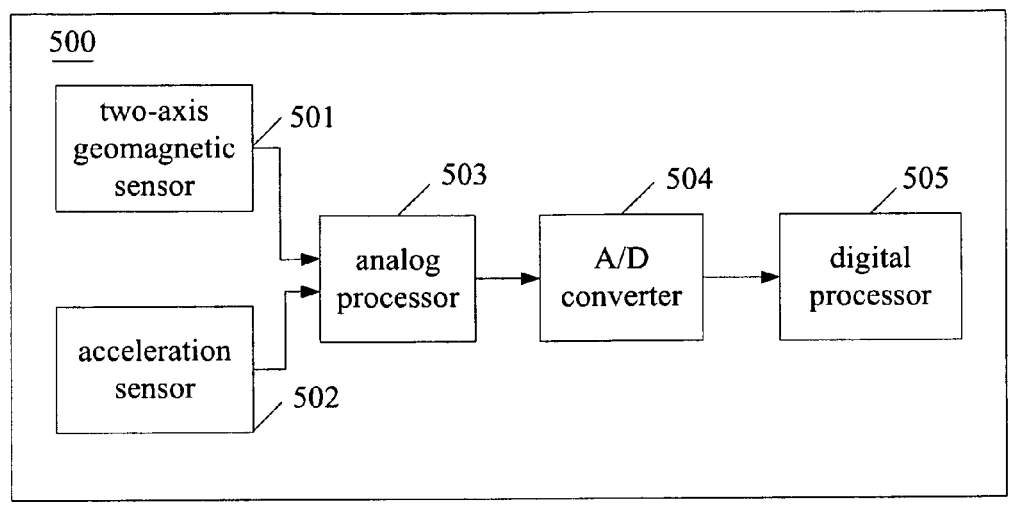
FIG. 1 is a block diagram of a conventional digital compass.

Various preferred embodiments of the invention will now be described with reference to the figures, wherein like reference numerals designate similar parts throughout the various views. As indicated above, the invention is directed to a digital compass including a geomagnetic sensor device which comprises a first Wheatstone bridge circuit and a second Wheatstone bridge circuit which are arranged in the same horizontal coordinate system, and a second geomagnetic sensor comprising a third Wheatstone bridge circuit and a fourth Wheatstone bridge circuit which are arranged in the same vertical coordinate system, each of the Wheatstone bridge circuits comprises at least four magnetoresistive elements connecting, a pair of power input terminals and a pair of signal output terminals. The present invention can obtain a stable and high output signal and achieve high measurement accuracy for the geomagnetic azimuth angle.

Figure 2:
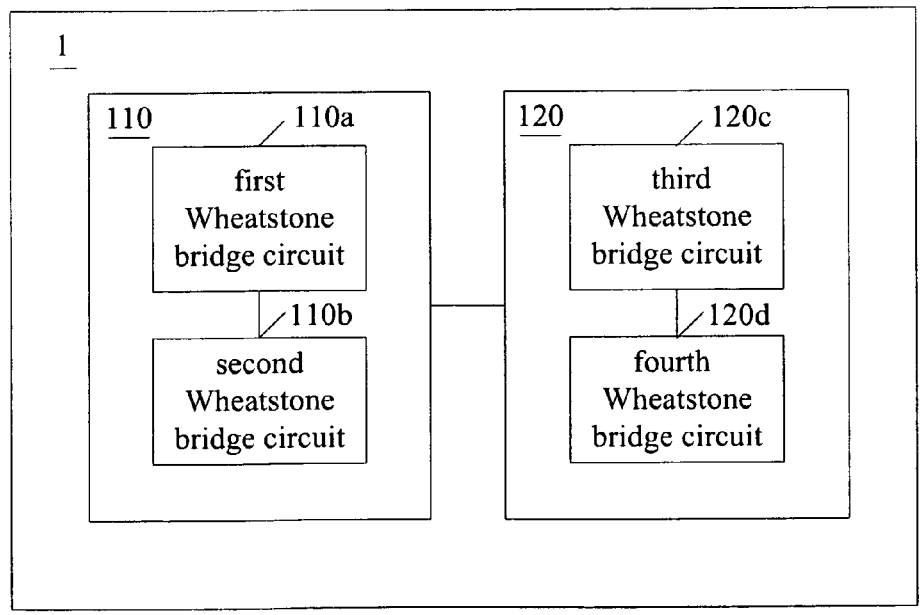
FIG. 2 is a block diagram of a geomagnetic sensor device according to a first embodiment of the present invention.
Figure 3:
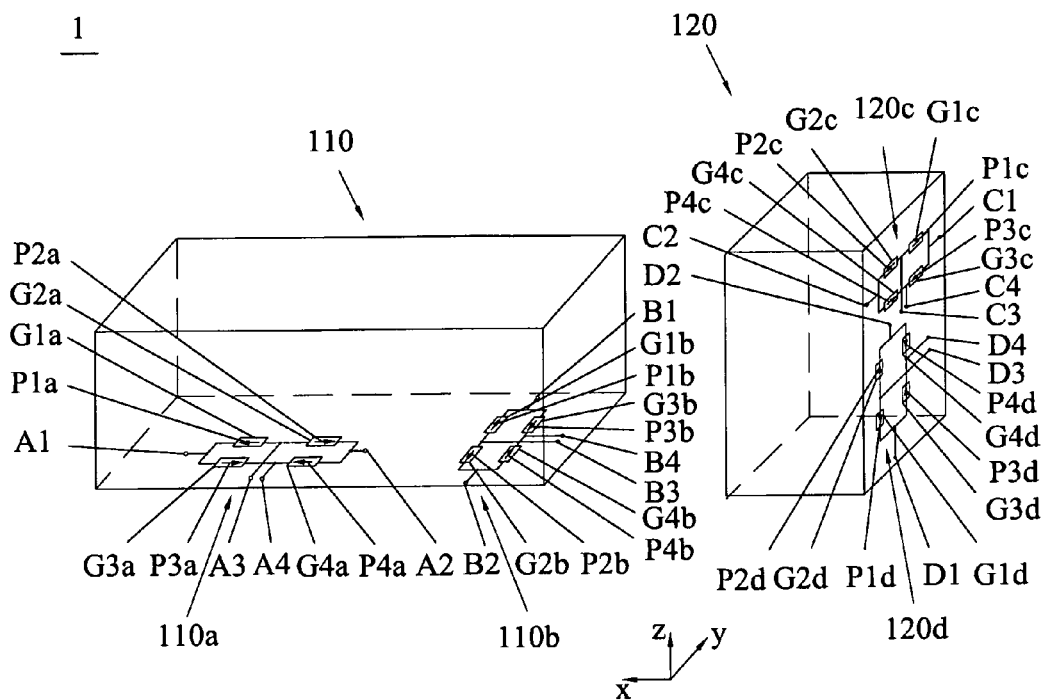
FIG. 3 is a sketch map of the geomagnetic sensor device shown in FIG. 2.

FIGS. 2-3 show a geomagnetic sensor device 1 according to a first embodiment of the present invention. As shown, the geomagnetic sensor device 1 includes a first geomagnetic sensor 110 and a second geomagnetic sensor 120. The first geomagnetic sensor 110 comprises a first Wheatstone bridge circuit 110a and a second Wheatstone bridge circuit 110b which are arranged in X-Y horizontal coordinate system. The second geomagnetic sensor 120 comprises a third Wheatstone bridge circuit 120c and a fourth Wheatstone bridge circuit 120d which are arranged in Y-Z vertical coordinate system. Concretely, the first Wheatstone bridge circuit 110a is vertical with the second Wheatstone bridge circuit 110b, both of which are in the same horizontal plane. Similarly, the third Wheatstone bridge circuit 120c is vertical with the fourth Wheatstone bridge circuit 120d, both of which are in the same vertical plane. Each Wheatstone bridge circuit is composed of four magnetoresistive elements, such as giant magnetoresistive (GMR) elements in this embodiment. Within the contemplation of the present invention, the magnetoresistive element also can be the tunnel magnetoresistive (TMR), anisotropic magnetoresistive (AMR) or Hall elements to form the Wheatstone bridge circuit.

Figure 4:
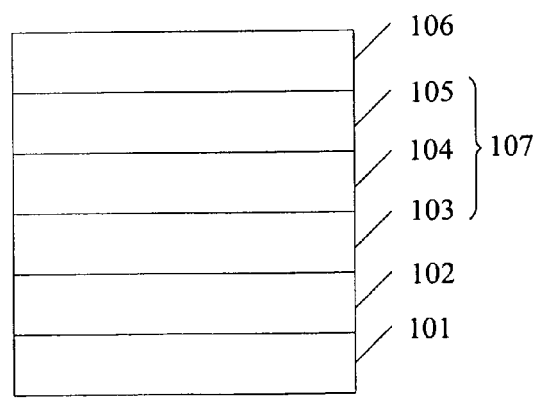
FIG. 4 is a structure view of a GMR element.

FIG. 4 shows the structure of the GMR element, which includes a substrate layer 101, a buffer layer 102, a fixed layer 107 and a capping layer 106 laminated in turns. Concretely, the fixed layer 107 includes a pin layer 105 for pinning the magnetization direction in a fixed direction, a free layer 103 with a magnetization direction that varies with an external magnetic field, and a space layer 104 sandwiched between the pin layer 105 and the free layer 103 serving as a non-magnetic electric conductor. As known, the resistance of the GMR element varies with the angle between the magnetization direction of the pin layer 105 and the magnetization direction of the free layer 103. And when the GMR element locates in an external magnetic field, the direction of the free layer 103 will change depending on the external magnetic field, that is, the angle between the magnetization direction of the pin layer 105 and the magnetization direction of the free layer 103. As a result, the resistance of the GMR element changes, which causes a voltage signal output for measuring the orientation of the geomagnetic field.

Figure 5:
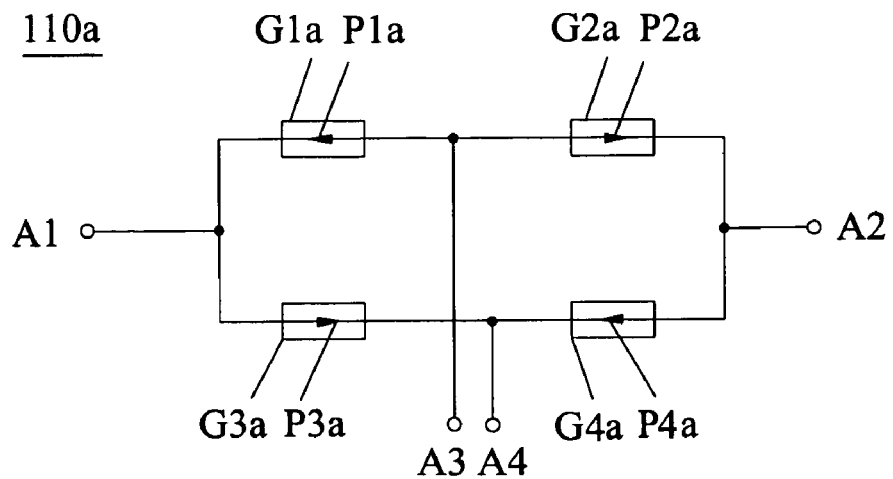
FIG. 5 is a detailed structure view of the first Wheatstone bridge circuit of the first geomagnetic sensor.

Now the detailed structure of the first Wheatstone bridge circuit 110a is described as following. As shown in FIG. 5, the first Wheatstone bridge circuit 110a comprises four GMR elements called for short G1a, G2a, G3a, and G4a, each of GMR elements has a magnetization direction indicated by P1a, P2a, P3a and P4a. Concretely, the four GMR elements connect together. The magnetization directions P1a, P2a, P3a and P4a are on the directions of the X-axis, concretely, the magnetization directions P1a and P4a are along the negative direction of the X-axis, while the magnetization directions P2a and P3a are along the positive direction of the X-axis. Namely, the magnetization directions P1a, P2a of G1a and G2a are opposite each other, and the magnetization directions P2a, P4a of G3a and G4a directly towards each other. Furthermore, the first Wheatstone bridge circuit 110a provides a pair of power input terminals and a pair of signal output terminals. For example, one end A1 between G1a and G3a, and one end A2 between G2a and G4a, serve as the two ends of the power input terminals; one end A3 between G1a and G2a, and one end A4 between G3a and G4a, serve as the two ends of the signal output terminals. Alternatively, the ends A1 and A2 also can serve as the signal output terminals, and the ends A3 and A4 serve as the power input terminals. The signal output depends on the resistance values of the G1a, G2a, G3a, and G4a, which vary with the magnetization directions under the outer magnetic field.

Similarly, the structure of the second Wheatstone bridge circuit 110b is similar to that of the first one. The second Wheatstone bridge circuit 110*b* also comprises G1*b*, 112*b*, G3*b*, G4*b*, each of which has a magnetization direction indicated by P1*b*, P2*b*, P3*b* and P4*b*. The difference is that, the magnetization directions P1*b*, P2*b*, P3*b* and P4*b* are on the directions of the Y-axis. Concretely, the magnetization directions P1*b* and P4*b* are along the positive direction of the Y-axis, while the magnetization directions P2*b* and P3*b* are along the negative direction of the Y-axis. Namely, the magnetization directions P1*b*, P2*b* of G1*b* and G2*b* are opposite each other, and the magnetization directions P2*b*, P4*b* of G3*b* and G4*b* direct towards each other. A pair of power input terminals B1, B2 is respectively set between G1*b* and G3*b* and between G2*b* and G4*b*, and a pair of signal output terminals B3, B4 is respectively set between G1*b* and G2*b* and between G3*b* and G4*b*.

Figure 6:
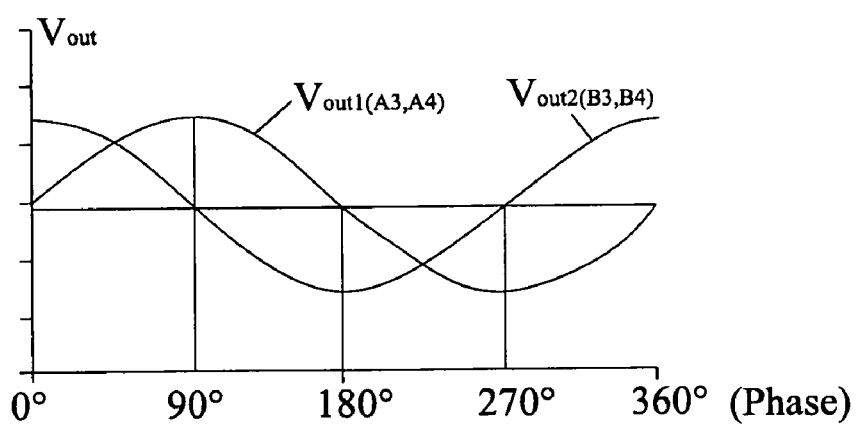
FIG. 6 is a graph of the output signals of first Wheatstone bridge circuit.

As one embodiment, the power input terminals A1 and B1 commonly input a certain voltage, and the power input terminals A2 and B2 are grounding. Alternatively, the power input terminals A2 and B2 have another different voltage than that of the terminals A1, B1. As described above, the magnetization direction of the first Wheatstone bridge circuit 110*a* is on the X-axis, and the magnetization direction of the second Wheatstone bridge circuit 110*b* is on the Y-axis, that is, they are vertical each other. Thus, when the direction of the external magnetic field changes from 0 to 180 degree, the magnetization directions of the first and second Wheatstone bridge circuit 110*a*, 110*b* change, which cause the signal output terminals A1, A2 of the first Wheatstone bridge circuit 110*a* to output a sine signal, and the signal output terminals B1, B2 of the second Wheatstone bridge circuit 110*b* to output a cosine signal. As a result, the pitching angle of the geomagnetic field related to the first geomagnetic sensor 110 can be determined by calculating the arc tangent of the sine signal and cosine signal. FIG. 6 shows a graph of the output signals of the terminals A3, A4 and terminals B3, B4, whose phase difference between the two signal outputs is 90 degree.

As shown in FIG. 3 again, the second geomagnetic sensor 120 comprises a third Wheatstone bridge circuit 120*c* and a fourth Wheatstone bridge circuit 120*d* which are arranged in Y-Z vertical coordinate system. Concretely, the third Wheatstone bridge circuit 120*c* is arranged along the Y-axis of the Y-Z vertical coordinate system, the fourth Wheatstone bridge circuit 120*d* is arranged along the Z-axis of the Y-Z vertical coordinate system. Specifically, the second Wheatstone bridge circuit 110*b* and the third Wheatstone bridge circuit 120*c* have the same arrangement and structure. The G1*c*, G2*c*, G3*c*, and G4*c*, each of GMR elements has a magnetization direction indicated by P1*c*, P2*c*, P3*c* and P4*c*. The magnetization directions P1*c*, P2*c*, P3*c* and P4*c* are on the directions of the Y-axis as the directions P1*b*, P2*b*, P3*b* and P4*b*, which the corresponding directions are the same. Power input terminals C1, C2 are respectively set between G1*c* and G3*c* and between G2*c* and G4*c*, and signal output terminals C3, C4 are respectively set between G1*c* and G2*c* and between G3*c* and G4*c*.

As mentioned, the fourth Wheatstone bridge circuit 120*d* arranged along the Z-axis of the Y-Z vertical coordinate system also includes four GMR elements called for short G1*d*, G2*d*, G3*d*, and G4*d*, each of GMR elements has a magnetization direction indicated by P1*d*, P2*d*, P3*d*, and P4*d*. Concretely, the magnetization directions P1*d* and P4*d* are along the negative direction of the Z-axis, while the magnetization directions P2*d* and P3*d* are along the positive direction of the Z-axis. Namely, the magnetization directions P1*d*, P2*d* of G1*d* and G2*d* are opposite each other, and the magnetization directions P2*d*, P4*d* of G3*d* and G4*d* direct towards each other. Power input terminals D1, D2 are respectively set between G1*b* and G3*d* and between G2*d* and G4*d*, and signal output terminals D3, D4 are respectively set between G1*d* and G2*d* and between G3*d* and G4*d*.

Similarly, the power input terminals C1 and D1 commonly input a certain voltage, and the power input terminals C2 and D2 are grounding. Alternatively, the power input terminals C2 and D2 have another voltage than that of the terminals C1, D1. As described above, the magnetization direction of the third Wheatstone bridge circuit 120*c* is on the Y-axis, and the magnetization direction of the fourth Wheatstone bridge circuit 120*d* is on the Z-axis, that is, they are vertical each other. Thus, when the direction of the external magnetic field changes from 0 to 180 degree, the magnetization directions of the third and fourth Wheatstone bridge circuit 120*c*, 120*d* change, which cause the signal output terminals C1, C2 of the third Wheatstone bridge circuit 120*c* to output a sine signal, and the signal output terminals D1, D2 of the fourth Wheatstone bridge circuit 110*d* to output a cosine signal. As a result, the second geomagnetic sensor 120 can measure out the tilt or roll angle of the geomagnetic field related to the geomagnetic sensor 120 by calculating the arc tangent of the sine signal and cosine signal. Similarly, the output signals of the terminals D1, D2 and terminals D3, D4, whose phase difference between the two signal outputs is 90 degree. By combining with the pitching angle measured out by the first geomagnetic sensor 110, and the roll angle measured out by the second geomagnetic sensor 120, the geomagnetic azimuth angle of the geomagnetic field can be measured and detected, and in turn, achieving the orientation.

Furthermore, as the magnetic directions of the second Wheatstone bridge circuit 110*b* and the third Wheatstone bridge circuit 120*d* are along the Y-axis, and their arrangements are identical, thus the Y-axis is the common axis of the first geomagnetic sensor 110 and the second geomagnetic sensor 120, and the output signals of the second Wheatstone bridge circuit 110*b* and the third Wheatstone bridge circuit 120*d* can be served as a calculation base line, therefore the measurement accuracy of the pitching angle and the roll angle is improved.

Basing on the above-mentioned structure and arrangement, the geomagnetic sensor device of the present invention can obtain a stable and high output signal and achieve high measurement accuracy for the geomagnetic azimuth angle.

Figure 7:
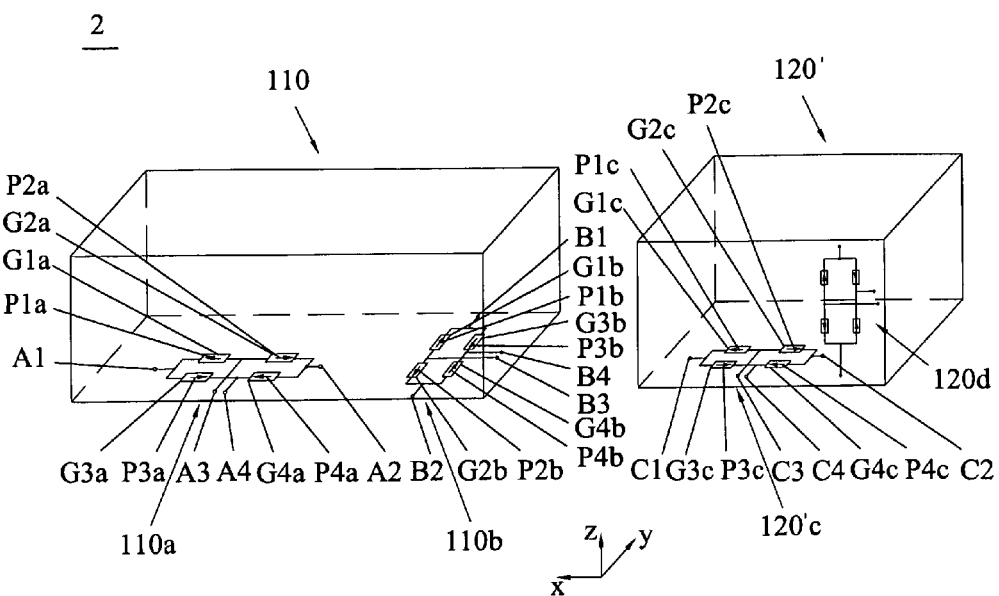
FIG. 7 is a sketch map of the geomagnetic sensor device according to a second embodiment of the present invention.

FIG. 7 shows a geomagnetic sensor device 2 according to the second embodiment of the present invention. The geomagnetic sensor device 2 of the second embodiment is similar to the first one substantially. The difference is that, the common axis of the first geomagnetic sensor 110 and the second geomagnetic sensor 120' is the X-axis. Concretely, the structure and arrangement of the first geomagnetic sensor 110 is identical to the first embodiment, but the arrangement of the second geomagnetic sensor 120' is different to the first one. More concretely, the second geomagnetic sensor 120' comprises a third Wheatstone bridge circuit 120'*c* and a fourth Wheatstone bridge circuit 120*d* which are arranged in X-Z vertical coordinate system, wherein the structure and arrangement of the fourth Wheatstone bridge circuit 120*d* is identical to the first embodiment, which is arranged along the Z-axis and whose magnetic directions P1*d*, P2*d*, P3*d*, and P4*d* are on the Z-axis. And the third Wheatstone bridge circuit 120'*c* of this embodiment is arranged along the X-axis of the X-Z vertical coordinate system, which has the same arrangement with the first Wheatstone bridge circuit 110*a*. The magnetization directions P1*c*, P2*c*, P3*c* and P4*c* are on the directions of the X-axis as the directions P1*a*, P2*a*, P3*a* and P4*a*, which the corresponding directions are the same. Power input terminals C1, C2 are respectively set between G1*c* and G3*c* and between G2c and G4c, and signal output terminals C3, C4 are respectively set between G1c and G2c and between G3c and G4c.

Similarly, the pitching angle of the geomagnetic field related to the first geomagnetic sensor 110 can be determined by calculating the arc tangent of the sine signal and cosine signal of their signal output terminals A3, A4 and B3, B4, and the tilt or roll angle of the geomagnetic field related to the geomagnetic sensor 120' can be determined by calculating the arc tangent of the sine signal and cosine signal of their signal output terminals C3, C4 and D3, D4, thus, the geomagnetic azimuth angle of the geomagnetic field can be measured and detected, and in turn, achieving the orientation.

In this embodiment, the X-axis is the common axis of the first geomagnetic sensor 110 and the second geomagnetic sensor 120', and the output signals of the first Wheatstone bridge circuit 110a and the third Wheatstone bridge circuit 120'c can be served as a calculation base line, therefore the measurement accuracy of the pitching angle and the roll angle is improved.

Figure 8:
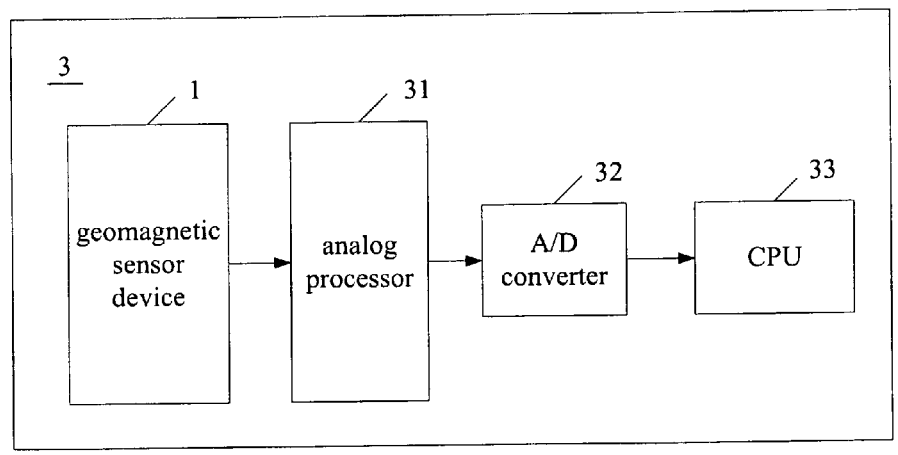
FIG. 8 is a block diagram of a digital compass according to one embodiment of the present invention.

FIG. 8 shows a digital compass 3 comprising a geomagnetic sensor device 1 or 2, an analog processor 31, an A/D converter 32 and a central processing unit (CPU) 33 connecting, according to one embodiment of the present invention. The geomagnetic sensor device 1 or 2 is arranged for measuring the pitching angle and the roll angle, and calculating the orientation information. The analog processor 31 is arranged for amplifying and filtering the signal detected by the geomagnetic sensor device 1 or 2, the A/D converter 32 is arranged for converting the output analog signal into digital signal, and the CPU 33 is arranged for performing the calculation, calibration and the necessary compensation.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A geomagnetic sensor device, comprising:
a first geomagnetic sensor comprising a first Wheatstone bridge circuit and a second Wheatstone bridge circuit which are arranged in the same horizontal coordinate system, and
a second geomagnetic sensor comprising a third Wheatstone bridge circuit and a fourth Wheatstone bridge circuit which are arranged in the same vertical coordinate system;
wherein each of the Wheatstone bridge circuits comprises at least four magnetoresistive elements connecting, a pair of power input terminals and a pair of signal output terminals.

2. The geomagnetic sensor device according to claim 1, wherein the horizontal coordinate system is X-Y horizontal coordinate system, the vertical coordinate system is Y-Z vertical coordinate system.

3. The geomagnetic sensor device according to claim 1, wherein the horizontal coordinate system is X-Y horizontal coordinate system, the vertical coordinate system is X-Z vertical coordinate system.

4. The geomagnetic sensor device according to claim 2, wherein the magnetization direction of the magetoresistive elements of the first Wheatstone bridge circuit is on the X-axis, the magnetization directions of the magetoresistive elements of the second Wheatstone bridge circuit and the third Wheatstone bridge circuit are on the Y-axis, and the magnetization direction of the magetoresistive elements of the fourth Wheatstone bridge circuit is on the Z-axis.

5. The geomagnetic sensor device according to claim 3, wherein the magnetization direction of the magetoresistive elements of the second Wheatstone bridge circuit is on the Y-axis, the magnetization directions of the magetoresistive elements of the first Wheatstone bridge circuit and the third Wheatstone bridge circuit are on the X-axis, and the magnetization direction of the magetoresistive elements of the fourth Wheatstone bridge circuit is on the Z-axis.

6. The geomagnetic sensor device according to claim 1, wherein the magnetoresistive elements are giant magnetoresistive, tunnel magnetoresistive, anisotropic magnetoresistive, or Hall elements.

7. A digital compass, comprising a geomagnetic sensor device, wherein the geomagnetic sensor device comprising:
a first geomagnetic sensor comprising a first Wheatstone bridge circuit and a second Wheatstone bridge circuit which are arranged in the same horizontal coordinate system, and
a second geomagnetic sensor comprising a third Wheatstone bridge circuit and a fourth Wheatstone bridge circuit which are arranged in the same vertical coordinate system;
wherein each of the Wheatstone bridge circuit comprises at least four magnetoresistive elements connecting, a pair of power input terminals and a pair of signal output terminals.

8. The digital compass according to claim 7, wherein the horizontal coordinate system is X-Y horizontal coordinate system, the vertical coordinate system is Y-Z vertical coordinate system.

9. The digital compass according to claim 7, wherein the horizontal coordinate system is X-Y horizontal coordinate system, the vertical coordinate system is X-Z vertical coordinate system.

10. The digital compass according to claim 8, wherein the magnetization direction of the magetoresistive elements of the first Wheatstone bridge circuit is on the X-axis, the magnetization directions of the magetoresistive elements of the second Wheatstone bridge circuit and the third Wheatstone bridge circuit are on the Y-axis, and the magnetization direction of the magetoresistive elements of the fourth Wheatstone bridge circuit is on the Z-axis.

11. The digital compass according to claim 9, wherein the magnetization direction of the magetoresistive elements of the second Wheatstone bridge circuit is on the Y-axis, the magnetization directions of the magetoresistive elements of the first Wheatstone bridge circuit and the third Wheatstone bridge circuit are on the X-axis, and the magnetization direction of the magetoresistive elements of the fourth Wheatstone bridge circuit is on the Z-axis.

12. The digital compass according to claim 7, wherein the magnetoresistive elements are giant magnetoresistive, tunnel magnetoresistive, anisotropic magnetoresistive, or Hall elements.

* * * * *